United States Patent
Bates et al.

(10) Patent No.: US 7,142,666 B1
(45) Date of Patent: Nov. 28, 2006

(54) METHOD AND APPARATUS FOR SELECTIVELY DISABLING A COMMUNICATION DEVICE

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 10/285,615

(22) Filed: Oct. 31, 2002

(51) Int. Cl.
*H04M 1/00* (2006.01)
*H04B 1/38* (2006.01)

(52) U.S. Cl. .................. 379/421; 379/422; 455/90.3

(58) Field of Classification Search ............... 379/421, 379/422, 433.01, 420.01–420.04; 455/575.1, 455/90.3
See application file for complete search history.

(56) References Cited

U.S. PATENT DOCUMENTS

| | | |
|---|---|---|
| 5,012,513 A | 4/1991 | Dale et al. |
| 5,608,794 A | 3/1997 | Larson |
| 5,655,018 A | 8/1997 | Estevez-Alcolado de Holl et al. |
| 5,835,585 A | 11/1998 | Morse |
| 6,002,763 A * | 12/1999 | Lester et al. ............ 379/421 |
| 6,097,809 A | 8/2000 | Lucey et al. |
| 6,154,538 A | 11/2000 | Nakano |

FOREIGN PATENT DOCUMENTS

| | | | | |
|---|---|---|---|---|
| JP | 405103064 A | * | 4/1993 | ......... 379/421 |
| JP | 407007536 A | * | 1/1995 | ......... 379/421 |

OTHER PUBLICATIONS wysiwyg://2/http://telecom.hellodirect.com/docs/Reviews/CordlessXLT.1.110200.asp, "Review: Hello Direct's Cordless XLT Headset", Dec. 5, 2001.
http://www.merl.com/projects/Audio_Buffer/Thi...is related (but this one I'd actually pay for!), "Mitsubishi Electric Research Laboratories", Dec. 6, 2001.
AUDIBIT Cal Centre Handset 1500 Product Specification, V1.1 Oct. 1999.

* cited by examiner

*Primary Examiner*—Bing Q. Bui
(74) *Attorney, Agent, or Firm*—Grant A. Johnson

(57) ABSTRACT

The present invention is directed at a telephone that automatically selectively disables a microphone when the microphone is moved out of close proximity to the user's mouth. One embodiment comprises a sensor that detect if the telephone microphone is in close proximity to a user's mouth and a switch that selectively mutes the telephone in response to the detection.

12 Claims, 3 Drawing Sheets

METHOD AND APPARATUS FOR SELECTIVELY DISABLING A COMMUNICATION DEVICE

FIELD OF THE INVENTION

The invention generally relates to telephone apparatuses. More particularly, the present invention provides a method and apparatus for automatically muting a telephone when it is taken away from a user's mouth.

BACKGROUND

Since Alexander Graham Bell uttered those famous words "Mr. Watson-come here-I want to see you", the telephone has evolved into a necessity of modern living. Land-based telephone systems are now found in virtually every home and business in the United States. Recent developments in wireless phones have only magnified this popularity.

As would be expected for such a ubiquitous item, various cultural norms have grown up around the use of the telephone. One such norm is that it is considered rude to sneeze or cough into the telephone set. Another norm is that it is considered rude to discipline one's children while on the telephone. Unfortunately, the events leading to these situations are not always controllable, which forces users to pull the handset away from their mouth and cover it with their hand. This reaction, however, is inconvenient and does not completely eliminate the ability of the other caller to hear the sneeze, cough, or discipline.

One partial solution to these problems is a mute button. Although this feature is common on modern telephones, users frequently are not able to find it when the urge to cough, sneeze, or discipline children arises.

Clearly, there is a need for an automatic way to mute the phone when it is taken away from the user's head.

SUMMARY

The present invention is directed at a telephone that automatically mutes when it is taken away from a user's head. Accordingly, one aspect of the present invention is a method for automatically muting a telephone handset, comprising detecting if the microphone is in close proximity to a user's mouth, and in response to the detection, automatically muting the telephone. In some embodiments, detecting if a telephone microphone is in close proximity to a user's mouth comprises generating a light beam and directing the light beam at a photocell such that beam is blocked if the telephone handset is in close proximity to the user's face. In other embodiments, detecting if a telephone microphone is in close proximity to a user's mouth comprises detecting an angle from vertical for the telephone handset.

Another aspect of the present invention is an automatic muting telephone handset, comprising a microphone that generates communication signals in response to voice communications, a sensor that generates detection signals indicative of whether the microphone is in close proximity to a user's mouth, and a control circuit that switches the microphone between an active mode and a muted mode in response to the detection signals from the sensor. Yet another aspect of the present invention is an automatic muting telephone, comprising a sensor that detects when a telephone microphone is in close proximity to a user's mouth and a switch operably connected to the sensor that mutes the telephone.

One feature and advantage of the present invention is that it allows end users to mute the handset without having to make an affirmative action, such as pressing a mute button or holding their hands over the mouthpiece. Another feature and advantage is that the present advantage can be easily integrated into conventional handset designs. These and other features, aspects, and advantages will become better understood with reference to the following description, appended claims, and accompanying drawings.

DETAILED DESCRIPTION

Figure 1:
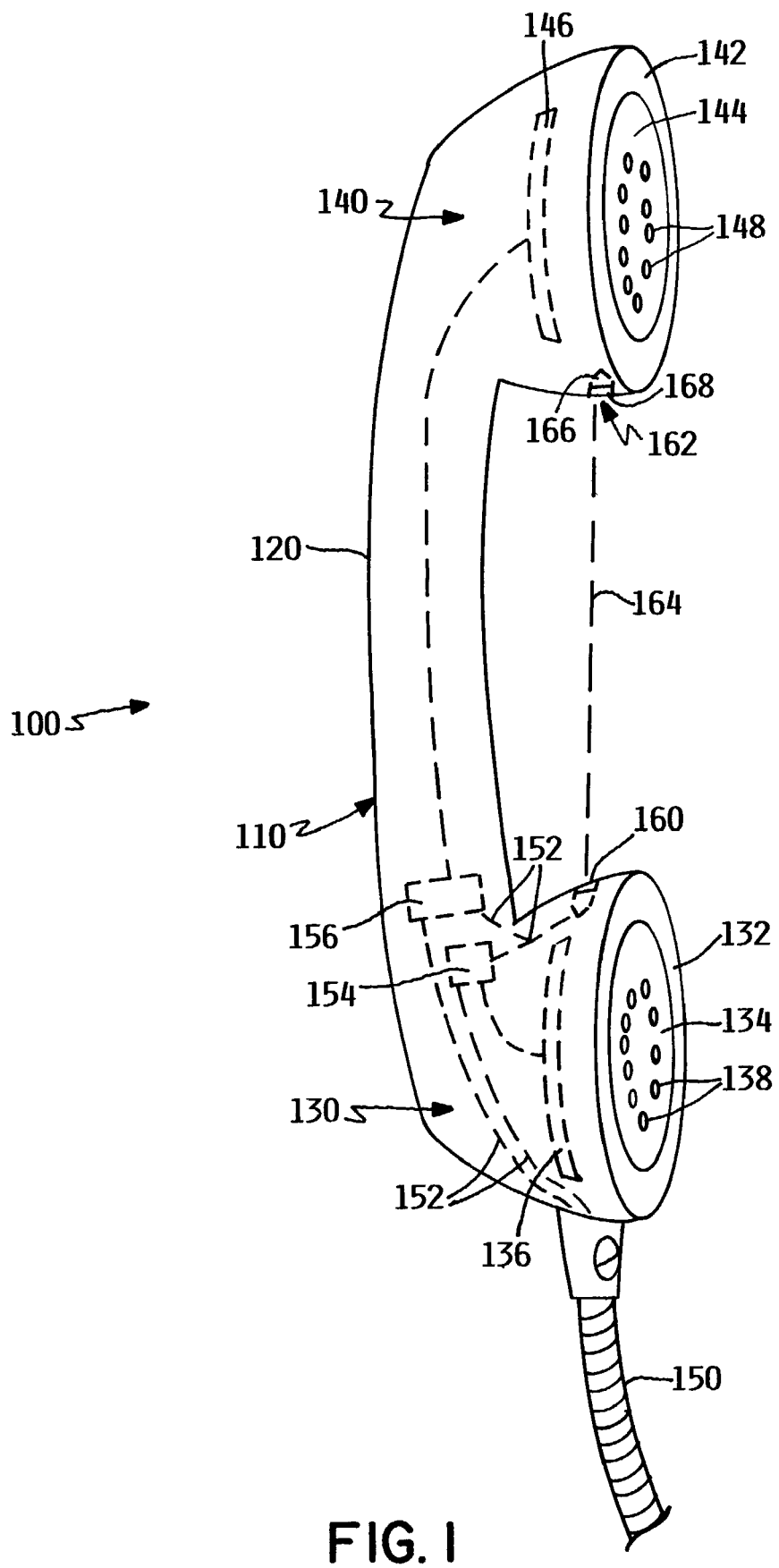
FIG. 1 is an isometric view of a telephone handset embodiment.

FIG. 1 is a side plan view of a telephone handset embodiment 100. This handset 100 embodiment comprises a shock resistant plastic case 110 having tubular handle portion 120 connected to a hemispherical receiver housing 130 and a hemispherical speaker housing 140. The receiver housing 130 has a planer ring-shaped surface 132, a concave recess 134, a microphone 136, a plurality of air holes 138 that allow for sound waves to travel from the user to the microphone 136, and a photoelectric detector 160. The speaker housing 140 includes a planer ring-shaped surface 142, a concave recess 144, a speaker 146, a plurality of air holes 148 that allow sound waves to travel between the speaker 146 and the user, and a light source 162. The handset 100 further includes a communication cable 150 that enters the handset 100 through the receiver housing 130, and plurality of internal wires 152 that allow for electrical communication signals to travel between the communication cable 150, a switch 154, the microphone 136, a noise generator 156, and the speaker 146.

In operation, the light source 160 projects a beam of light 164 toward the photoelectric detector 162. This light beam can pass between the light source 160 and the photoelectric detector 162 when the user is merely holding the handset 100, but is interrupted when the user holds the speaker housing 160 against his or her ear. During those periods when the light beam 164 is interrupted (i.e., the light from the light source 162 does not strike the photocell 160), the switch 154 allows electrical communication to occur between the microphone 136 and the communication cable 150. During those periods when the light beam 164 is not interrupted (i.e., when the light from the light source 162 strikes then photocell 160), the switch 154 does not allow electrical communication to occur between the microphone 136 and the communication cable 150, but does activate the noise generator 156. This, in turn, prevents the handset 100 from transmitting any sounds and causes the speaker 146 to emit a characteristic sound to alert the user that the handset 100 is muted.

The light source 162 can be any device capable of generating a beam of light 164 of sufficient strength to excite the photoelectric cell. It is desirable that the light source 162 also be capable of operation using the low voltage signals normally transmitted over telephone wires. One suitable light source 162 is comprised of a "Super Bright" light emitting diode ("LED") 166, available from Radio Shack under the part number 276-087A, and a lense 168 to focus the light at the photoelectric cell 160.

The photoelectric detector 160 may similarly be any device capable of changing its electrical characteristics in response to being struck by the light source 162. Again, it is desirable that the photoelectric detector 160 be capable of operation using the low voltage signals normally transmitted over telephone wires. One suitable photoelectric detector 160 is a cadmium sulphide cell sensor, such as that available from Radio Shack under the part number 276-1657.

The light source 162 and photoelectric cell 160 in this embodiment should be positioned such that the user's hand does not block the beam 164, and such that the user's face blocks the beam 164 when the handset 100 is pressed against the user's face with the microphone 136 in close proximity to the user's mouth. One suitable location is to place the light source 162 and the photoelectric cell 160 as close to the speaker housing rim 142 and microphone housing rim 132, respectively, as is possible. However, other locations are within the scope of the present invention.

The switch 154 may be any device capable of switching in response to the signal from the photoelectric cell the microphone 136 between an active mode, in which the telephone to which the handset 100 is attached transmits signals indicative of the user's voice, and a muted mode, in which the telephone to which the handset 100 is attached does not transmit signals indicative of the user's voice. In this embodiment, the switch comprises a field effect transistor ("FET") that selectively opens and closes the circuit between connecting the microphone 136 to the communication cable 150.

The noise generator 156 may be any device capable of switch should also be capable of generating a characteristic sound at the speaker 146 in response to the signal from the photoelectric cell 160. This characteristic sound should be soft enough in volume that the user can still hear whatever is being transmitted over the telephone, and should be unusual enough that the user is unlikely to mistake the sound for anything else. One suitable noise generator is a D to A converter with an associated amplifier to produce an appropriate tone. Shutting off the speaker (no tone) is also a possible signalling mechanism.

Figure 2:
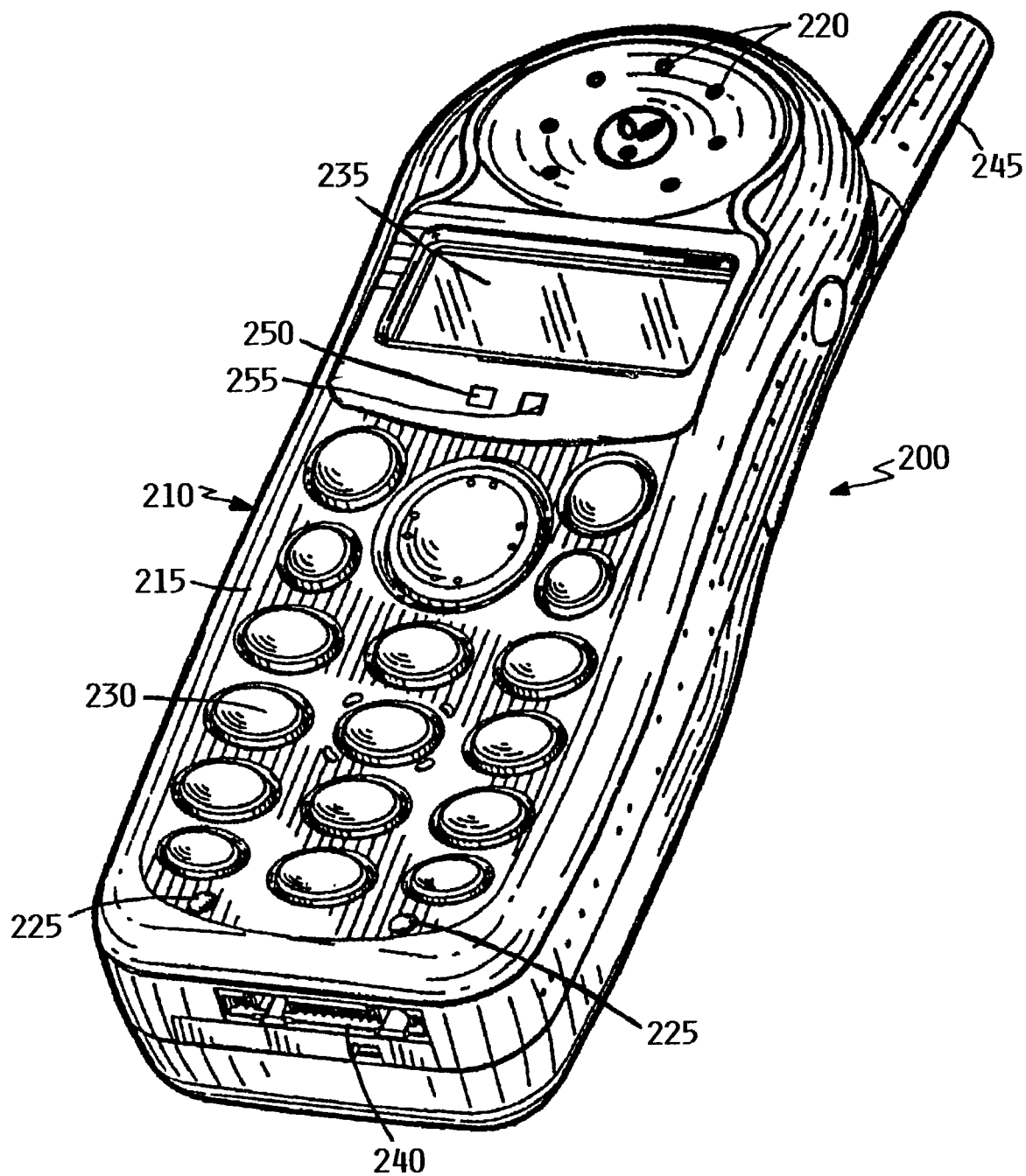
FIG. 2 is an isometric plan view of an alternate handset embodiment.

FIG. 2 is an isometric view of a second telephone handset embodiment 200. This handset 100 embodiment comprises a shock resistant plastic case 210 that defines a generally planar front surface 215, a plurality of speaker air passages 215, and a plurality of microphone air passages 225; a numeric keypad 230, a liquid crystal display 235, a power adaptor 240, an antenna 245, an infrared light source 250, and an infrared light detector 255.

Figure 3:
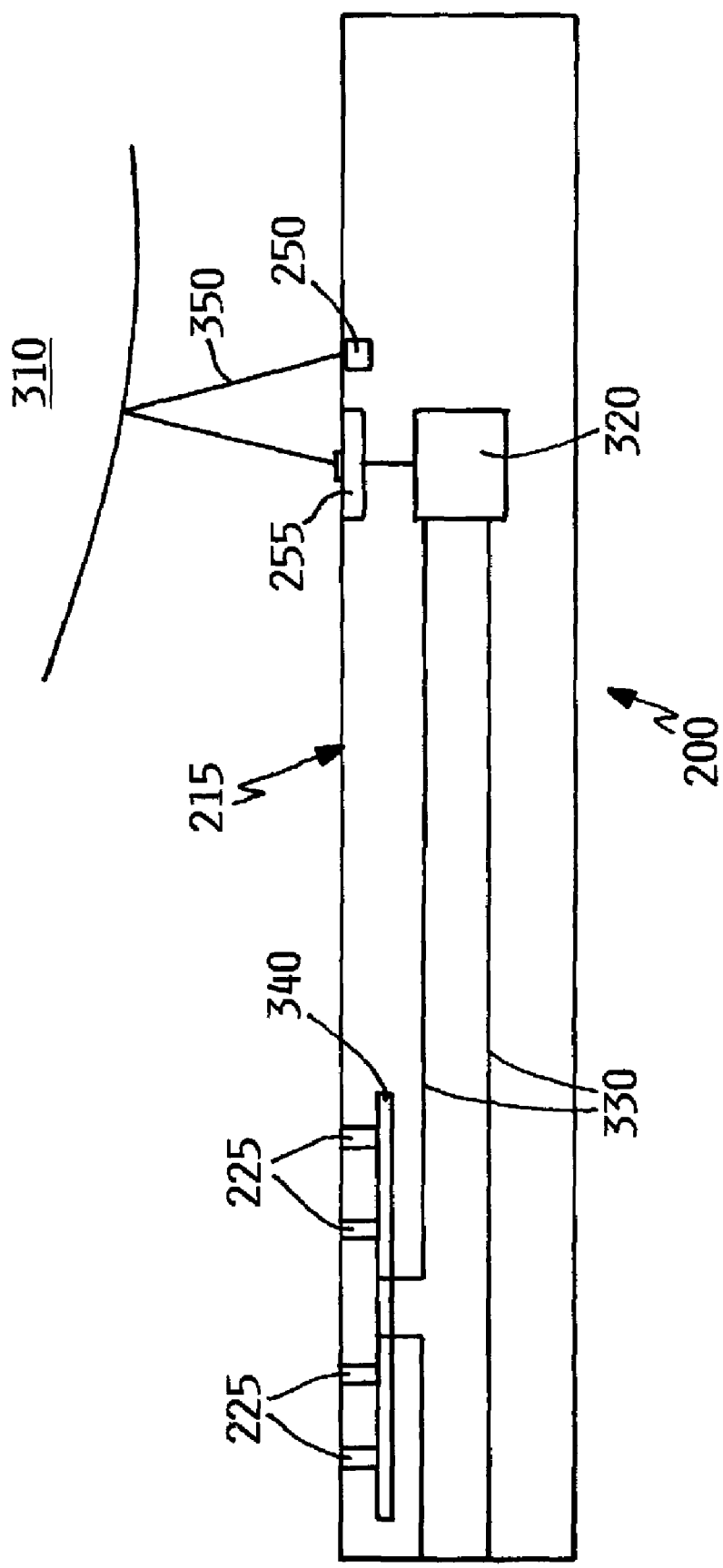
FIG. 3 is a sectional view showing the embodiment in FIG. 2.

FIG. 3 is a simplified sectional view of the handset 200 in FIG. 2 in operation. This figure includes a portion of the user's face 310, a switch operably connected the infrared detector 255 and to a microphone 340 via internal wires 330. In operation, the infrared light source 250 projects a beam of infrared light 350 toward the user's face 310. This beam reflects off the user's face 310 and into the infrared detector 255 when the user is holding the handset 200 in close proximity to his or her face 310. This, in turn, causes the infrared detector 255 to generate an electrical signal, which closes the switch 320 and allows signals from the microphone 340 to travel to the antenna. When the handset 200 is not in close proximity to the user's face, however, the beam 350 does not strike the detector 255 with sufficient intensity to excite the detector 255. This causes the switch 320 to remain in its open state, which prevents signals from passing between the microphone 340 and the antenna. Like the embodiment in FIG. 1, the embodiment in FIGS. 2–3 may also use the switch 340 to causes the handset 200 to emit a characteristic sound from its speaker when the handset is muted.

The infrared light source 250 can be any device capable of generating the beam of infrared light 150 of sufficient strength to excite the infrared detector 255 if the user's face 310 is in close proximity. The infrared detector 255 may similarly be any device capable of changing its electrical characteristics in response to being struck by infrared light 350 reflected off the user's face 310. One suitable emitter and detector combination is available from Sharp under the model number GPIU5.

Although the present invention has been described in detail with reference to certain examples thereof, it may also be embodied in other specific forms without departing from the essential spirit or attributes thereof. For example, the photoelectric sensing systems in FIGS. 1–3 may be replaced or supplemented by other means of detecting whether the handset should be muted. Thus, for example, some embodiments may mount a pressure or capacitance sensor to the ring-shaped surface 142 that can detect when the handset 100, 200 is being held against the user's ear. Other embodiments may use sonic measuring devices, similar to those found in automatic focus cameras, to detect whether or not the handset is in close proximity to the user's face.

Still other embodiments of the present invention may also use a sensor, such as a mercury switch, capable of detecting an angle from vertical. These sensors in these embodiments would detect when a user holds the handset 100 or the handset 200 at an angle of more than about 90 degrees from vertical. These embodiments may be desirable because they can detect when the user pivots the microphone 136 or the microphone 340 away from his or her mouth, but keeps the speaker housing 140 or speaker 220 firmly placed against his or her ear. Those skilled in the art will appreciate that these sensors can be used in place of or in conjunction with the sensors described with reference to FIGS. 1–3.

The accompanying figures and this description depicted and described embodiments of the present invention, and features and components thereof. With regard to means for fastening, mounting, attaching or connecting the components of the present invention to form the mechanism as a whole, unless specifically described otherwise, such means were intended to encompass conventional fasteners such as machine screws, nut and bolt connectors, machine threaded connectors, snap rings, screw clamps, rivets, nuts and bolts, toggles, pins and the like. Components may also be connected by welding, friction fitting, adhesives, or deformation, if appropriate. Electrical connections or position sensing components may be made using appropriate electrical components and connection methods, including conventional components and connectors. Unless specifically otherwise disclosed or taught, materials for making components of the present invention were selected from appropriate materials, such as metal, metallic alloys, fibres, polymers and the like, and appropriate manufacturing or production methods including casting, extruding, molding and machining may be used. In addition, any references to front and back, right and left, top and bottom and upper and lower were intended for convenience of description, not to limit the present invention or its components to any one positional or spatial orientation.

Accordingly, it is desired that the embodiments described herein be considered in all respects as illustrative, not restrictive, and that reference be made to the appended claims for determining the scope of the invention.

We claim:

1. A method for automatically muting a telephone, comprising:
   detecting if a telephone microphone is in close proximity to a user's mouth, wherein the detecting comprises:
      generating an infrared beam;
      reflecting the infrared beam off a user's face when the telephone handset is in close proximity to the user's face;
   automatically enabling the telephone microphone when the telephone microphone is in close proximity to the user's mouth; and
   automatically disabling the telephone microphone when the telephone microphone is not in close proximity to the user's mouth.

2. The method of claim 1, further comprising, in response to detecting that telephone microphone is not in close proximity to the user's mouth, generating a muted state alert signal.

3. The method of claim 1, wherein detecting if a telephone microphone is in close proximity to a user's mouth further comprises detecting an angle from vertical for the telephone handset.

4. An automatic muting telephone, comprising:
   a sensor that detects when a telephone microphone is in close proximity to a user's mouth,
   wherein the sensor detects when the telephone is in contact with the user; and
   a switch operably connected to the sensor that selectively enables the telephone microphone in response to the detection.

5. The telephone of claim 4, further comprising a noise generator that selectively generates a characteristic noise in response to the signal from the sensor.

6. The telephone of claim 4, further comprising a speaker housing; and
   wherein the sensor comprises a pressure sensor associated with the speaker housing.

7. The telephone of claim 4, further comprising a speaker housing; and
   wherein the sensor comprises a capacitance sensor associated with the speaker housing.

8. An automatic muting telephone handset, comprising:
   (a) a microphone that generates communication signals in response to voice communications;
   (b) a sensor that generates detection signals indicative of whether the microphone is in close proximity to a user's mouth; and
   (c) a control circuit that switches the microphone between a muted mode and an active mode in response to the detection signals from the sensor.

9. The telephone of claim 8, further comprising a speaker housing; and
   wherein the sensor comprises a pressure sensor associated with the speaker housing.

10. The telephone of claim 8, further comprising a speaker housing; and
    wherein the sensor comprises a capacitance sensor associated with the speaker housing.

11. The telephone of claim 8, further comprising a handset case; and
    wherein the sensor comprises a photocell associated with the handset case.

12. The telephone of claim 8, further comprising a handset case; and
    wherein the sensor comprises an infrared detector associated with the handset case.

* * * * *